US012561140B2

(12) United States Patent
Desai et al.

(10) Patent No.: US 12,561,140 B2
(45) Date of Patent: Feb. 24, 2026

(54) BITWIDTH RESPONSIVE PROCESS OPERATIONS

(71) Applicant: QUALCOMM Incorporated, San Diego, CA (US)

(72) Inventors: Rohan Desai, San Diego, CA (US); Vinod Kumar Nahval, Mountain House, CA (US); Xiaoyun Jiang, San Diego, CA (US); Yuta Toriyama, San Diego, CA (US); Hyung Cook Kim, San Diego, CA (US); Weiliang Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 18/635,738

(22) Filed: Apr. 15, 2024

(65) Prior Publication Data

US 2025/0321742 A1     Oct. 16, 2025

(51) Int. Cl.
*G06F 9/30*          (2018.01)

(52) U.S. Cl.
CPC ................................ *G06F 9/30149* (2013.01)

(58) Field of Classification Search
None
See application file for complete search history.

(56) References Cited

U.S. PATENT DOCUMENTS

2020/0371580 A1    11/2020  Lee et al.
2025/0123798 A1*    4/2025  Lee ......................... G06F 3/165

\* cited by examiner

*Primary Examiner* — Scott C Sun
(74) *Attorney, Agent, or Firm* — NORTON ROSE FULBRIGHT US LLP

(57) ABSTRACT

This disclosure provides systems, methods, and devices for efficiently processing data from sensors with varying bitwidths. In one aspect, a method is provided that includes receiving, at a processor, first data from a sensor where the data bitwidth exceeds the processor's predetermined maximum bitwidth. The method involves determining a first and a second subset of the data, processing the subsets to generate processed data, and then determining output data that blends the processed data to match the original bitwidth. Other techniques and implementations are also discussed.

20 Claims, 6 Drawing Sheets

500

RECEIVE, AT A PROCESSOR, FIRST DATA FROM A FIRST SENSOR, WHEREIN THE FIRST DATA HAS A FIRST BITWIDTH
502

DETERMINE THAT THE FIRST BITWIDTH IS GREATER THAN A PREDETERMINED BITWIDTH ASSOCIATED WITH THE PROCESSOR
504

DETERMINE A FIRST SUBSET OF THE FIRST DATA AND A SECOND SUBSET OF THE FIRST DATA
506

PROCESS THE FIRST SUBSET AND THE SECOND SUBSET TO DETERMINE FIRST PROCESSED DATA AND SECOND PROCESSED DATA
508

DETERMINE, BY THE PROCESSOR, OUTPUT DATA BASED ON THE FIRST AND SECOND PROCESSED DATA, WHEREIN THE OUTPUT DATA HAS THE FIRST BITWIDTH
510

*FIG. 5*

BITWIDTH RESPONSIVE PROCESS OPERATIONS

TECHNICAL FIELD

Aspects of the present disclosure relate generally to data processing techniques, and more particularly, to methods and systems suitable for processing data with different bitwidths.

INTRODUCTION

Sensor data processing encompasses a broad range of computational methodologies designed to enable processors to receive and interpret data from various types of sensors. Sensor data processing may include time-domain analysis, often used for accelerometers and gyroscopes, where data is interpreted as changes over time; frequency-domain analysis, commonly applied to audio or radio frequency sensors, which involves the identification of patterns in the frequency spectrum; and image processing, used for cameras or optical sensors, which combines both spatial and color data. Furthermore, sensor data may have a particular bitwidth, which may represent the number of bits used to represent each data point from the sensor. The bitwidth can significantly impact the precision and range of the sensor data, thereby influencing the accuracy of the subsequent processing and interpretation.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One aspect provides a method that includes receiving, at a processor, first data from a first sensor, wherein the first data has a first bitwidth; determining that the first bitwidth is greater than a predetermined bitwidth associated with the processor; determining a first subset of the first data and a second subset of the first data, wherein a first size of the first subset and a second size the second subset are less than or equal to the predetermined bitwidth of the processor; processing the first subset and the second subset to determine first processed data and second processed data; and determining, by the processor, output data based on the first and second processed data, wherein the output data has the first bitwidth.

Another aspect provides a device that includes one or more sensors comprising a first sensor; and one or more processors comprising a first processor configured to receive, at a processor, first data from a first sensor, wherein the first data has a first bitwidth; determine that the first bitwidth is greater than a predetermined bitwidth associated with the processor; determine a first subset of the first data and a second subset of the first data, wherein a first size of the first subset and a second size the second subset are less than or equal to the predetermined bitwidth of the processor; process the first subset and the second subset to determine first processed data and second processed data; and determine, by the processor, output data based on the first and second processed data, wherein the output data has the first bitwidth.

A further aspect provides a system that includes a processor configured to receive, at a processor, first data from a first sensor, wherein the first data has a first bitwidth; determine that the first bitwidth is greater than a predetermined bitwidth associated with the processor; determine a first subset of the first data and a second subset of the first data, wherein a first size of the first subset and a second size the second subset are less than or equal to the predetermined bitwidth of the processor; process the first subset and the second subset to determine first processed data and second processed data; and determine, by the processor, output data based on the first and second processed data, wherein the output data has the first bitwidth.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur.

Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes. 1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 is a flow chart illustrating an example method for bitwidth responsive processor operation according to one or more aspects of the disclosure.

Like reference numbers and designations in the various drawings indicate like elements.

DETAILED DESCRIPTION

Figure 1:
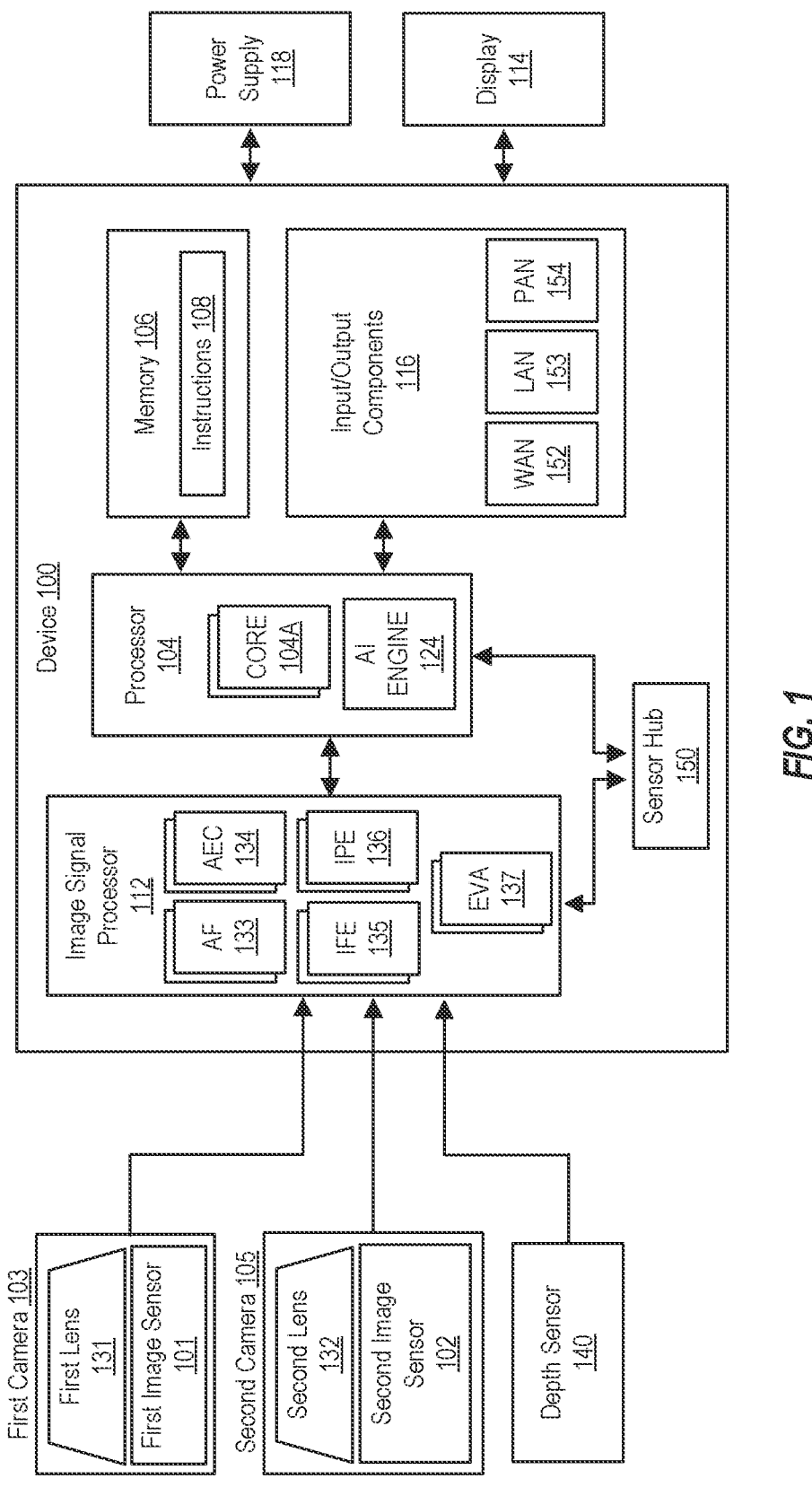
FIG. 1 shows a block diagram of an example image processing configuration for a vehicle according to one or more aspects of the disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support data processing, including techniques for adjusting processor operation based on the bitwidth of received data. In existing data processing systems, components within processors (such as image signal processors (ISPs)) are typically configured to accommodate a maximum supported bitwidth, which dictates the design and operational capacity of these components for data processing. In particular, data sensors, such as high dynamic range image sensors may have a wide range of potential bitwidths (such as 10 to 24 bits or more). Typically, to accommodate the wide range of possible bitwidths, processors are designed to accommodate maximum expected bitwidth from sensors. Although functional, such techniques results in a larger area requirement for chips, leading to higher costs and complexity and longer development times. Additionally, such techniques result in chips that use higher power. For instance, to process 10-bit sensor data on a 24 bit processor, data typically has to be left-shifted (e.g., MSB aligned), resulting in unnecessary power usage due to processing larger bitwidths than necessary.

One solution to this problem is to design processors to support data of a particular bitwidth (such as an efficient bandwidth), and then to adjust operation of the processors if data that exceeds the designed bitwidth is received. In particular, the processors may be configured to split higher bitwidth sensor data into two or more smaller bitwidth data subsets. The separate subsets may then be processed separately and then merged back into a single data point with the original higher bitwidth.

In some aspects, the present disclosure provides techniques for image signal processing that may be particularly beneficial in reducing the physical area required for ISPs and improving power efficiency for a broad range of sensor bitwidths. For example, by allowing ISPs to natively process data at their optimized bitwidth and only adjusting when higher bitwidth sensors are used, these techniques may reduce the silicon area needed for processors by avoiding the need to design for the worst-case scenarios and maximum possible bitwidths. This not only reduces manufacturing costs but also simplifies the chip design process by reducing the complexity associated with higher bitwidth ISPs.

Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described herein may present other benefits than, and be used in other applications than, those described above.

FIG. 1 shows a block diagram of an example processing system 100 according to one or more aspects of the disclosure. The processing system 100 may include, or otherwise be coupled to, an image signal processor 112 for processing image frames from one or more image sensors, such as a first image sensor 101, a second image sensor 102, and a depth sensor 140. In some implementations, the processing system 100 also includes or is coupled to a processor (e.g., CPU) 104 and a memory 106 storing instructions 108. The processing system 100 may also include or be coupled to a display 114 and input/output (I/O) components 116. I/O components 116 may be used for interacting with a user, such as a touch screen interface and/or physical buttons. I/O components 116 may also include network interfaces for communicating with other devices, such as other computing devices, mobile devices, vehicles, and/or a remote monitoring system. The network interfaces may include one or more of a wide area network (WAN) adaptor 152, a local area network (LAN) adaptor 153, and/or a personal area network (PAN) adaptor 154. An example WAN adaptor 152 is a 4G LTE or a 5G NR wireless network adaptor. An example LAN adaptor 153 is an IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands. The processing system 100 may further include or be coupled to a power supply 118, such as a mains power supply, a battery, and the like. The processing system 100 may also include or be coupled to additional features or components that are not shown in FIG. 1. In one example, a wireless interface, which may include one or more transceivers and associated baseband processors, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The processing system 100 may include a sensor hub 150 for interfacing with and/or receiving data from sensors (such as non-camera sensors). One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In further examples, a non-camera sensor may be a global positioning system (GPS) receiver, a light detection and ranging (LiDAR) system, a radio detection and ranging (RADAR) system, or other ranging systems. For example, the sensor hub 150 may interface to a vehicle bus for sending configuration commands and/or receiving information from vehicle sensors 172, such as distance (e.g., ranging) sensors or vehicle-to-vehicle (V2V) sensors (e.g., sensors for receiving information from nearby vehicles). Other examples of sensors may include pressure sensors, temperature sensors, light sensors, and the like. In certain implementations, the sensors may be communicatively coupled to the sensor hub 250 through a direct connection (such as a bus connection). In additional or alternative implementations, the sensors may be indirectly coupled to the sensor hub (such as via a network connection).

The image signal processor (ISP) 112 may receive image data, such as used to form image frames. In one embodiment, a local bus connection couples the image signal processor 112 to image sensors 101 and 102 of a first camera 103 and second camera 105, respectively. In another embodiment, a wire interface may couple the image signal processor 112 to an external image sensor. In a further embodiment, a wireless interface may couple the image signal processor 112 to the image sensor 101, 102.

The first camera 103 may include the first image sensor 101 and a corresponding first lens 131. The second camera 105 may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140. In some embodiments, the lenses 131 and 132 may have a fixed focus.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging.

Each of the cameras 103, 105 may include one, two, or more image sensors 101, 102. For example, the camera 103 may include a first image sensor 101 and a second image sensor (not depicted). When multiple image sensors are present, the first image sensor 101 may have a larger field of view (FOV) than the second image sensor or the first image sensor 101 may have different sensitivity or different dynamic range than the second image sensor. In one example, the first image sensor 101 may be a wide-angle image sensor, and the second image sensor may be a telephoto image sensor. In another example, the first image sensor 101 is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view. Although the example discussed above focused on the first camera 103, the second camera 105 may be configured using one or more of the configurations discussed above (such as with a first image sensor 102 and a second image sensor (not depicted)).

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. The apparatus may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines (IPEs) 136, and or one or more auto exposure compensation (AEC) 134 engines. The AF 133, AEC 134, IFE 135, IPE 136 may each include application-specific circuitry, be embodied as software code executed by the ISP 112, and/or a combination of hardware within and software code executing on the ISP 112.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed during operation of the processing system 100 for generating images or videos. The instructions 108 may also include other applications or programs executed for the processing system 100, such as an operating system, mapping applications, or entertainment applications. Execution of the camera application, such as by the processor 104, may cause the processing system 100 to generate images using the image sensors 101 and 102 and the image signal processor 112. The memory 106 may also be accessed by the image signal processor 112 to store processed frames or may be accessed by the processor 104 to obtain the processed frames. In some embodiments, the processing system 100 includes a system on chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including object detection, image processing, natural language processing, text generation, risk map generation, driver monitoring, driver alert operations, and the like. For example, execution of the instructions can instruct the image signal processor 112 to begin or end capturing an image frame or a sequence of image frames. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106. In executing the camera application, the processor 104 may be configured to instruct the image signal processor 112 to perform one or more operations with reference to the image sensors 101, 102, as discussed above.

In some embodiments, the processor 104 may include ICs or other hardware (e.g., an artificial intelligence (AI) engine 124) in addition to the ability to execute software to cause the processing system 100 to perform a number of functions or operations, such as the operations described herein. In some other embodiments, the processing system 100 does not include the processor 104, such as when all of the described functionality is configured in the image signal processor 112. In particular embodiments, the processor 104 and/or another processor of the processing system 100 may include a machine learning processor. Machine learning processors may include one or more processing units tailored for operating/manipulating machine learning data/features structures (e.g., tensors), executing machine learning algorithms, or a combination thereof. A first example machine learning processor includes Neural Processors (NPs), hardware components specifically designed to perform calculations necessary for artificial neural networks, leveraging parallel processing capabilities to handle complex computational tasks efficiently. A second example machine learning processor includes Hardware-Based Machine Learning Accelerators (MLAs) that enhance the speed of machine learning applications by optimizing the underlying hardware for specific machine learning algorithms (such as for particular types of computing operations). A third example machine learning processor may include an machine learning (ML) core within a CPU, which may be embedded in a traditional CPU and may be specifically optimized to accelerate machine learning workloads or computations. A fourth example machine learning processor may include Neural Signal Processors (NSPs) and/or Neural Processing Units (NPUs) are other types of processors that are designed for optimized performance with neural network-based workloads.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104.

While the processing system 100 is referred to in the examples herein for including aspects of the present disclosure, some device components may not be shown in FIG. 1 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the processing system 100.

Figure 2:
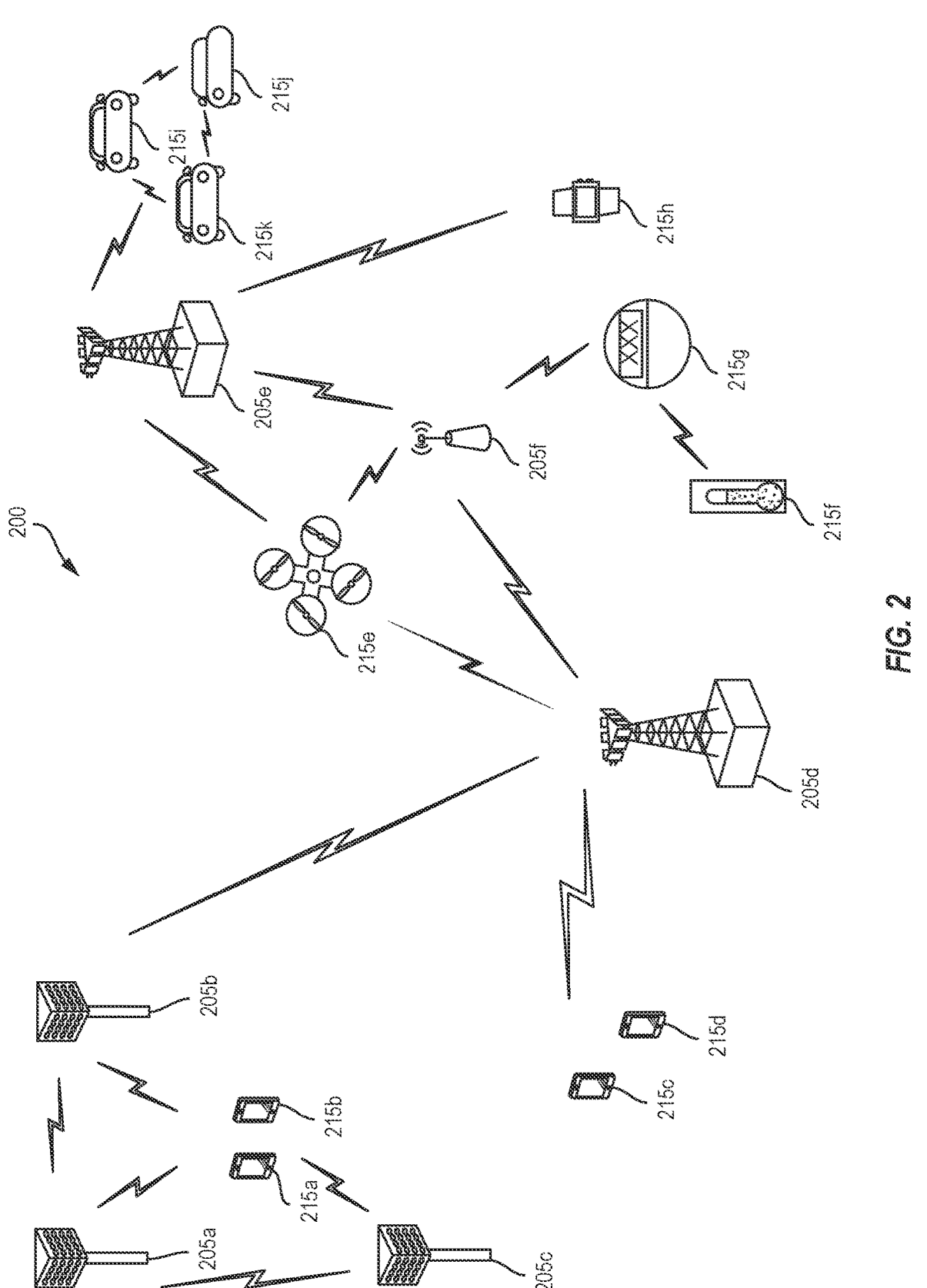
FIG. 2 is a block diagram illustrating details of an example wireless communication system according to one or more aspects.

The processing system 100 may communicate as a user equipment (UE) within a wireless network 200, such as through WAN adaptor 152, as shown in FIG. 2. FIG. 2 is a block diagram illustrating details of an example wireless communication system according to one or more aspects. Wireless network 200 may, for example, include a 5G wireless network. As appreciated by those skilled in the art, components appearing in FIG. 2 are likely to have related counterparts in other network arrangements including, for example, cellular-style network arrangements and non-cellular-style-network arrangements (e.g., device-to-device or peer-to-peer or ad-hoc network arrangements, etc.).

Wireless network 200 includes base stations 205 and other network entities. A base station may be a station that communicates with the UEs and may also be referred to as an evolved node B (eNB), a next generation eNB (gNB), an access point, and the like. Each base station 205 may provide communication coverage for a particular geographic area. In 3GPP, the term "cell" may refer to this particular geographic coverage area of a base station or a base station subsystem serving the coverage area, depending on the context in which the term is used. In implementations of wireless network 200 herein, base stations 205 may be associated with a same operator or different operators (e.g., wireless network 200 may include a plurality of operator wireless networks).

Additionally, in implementations of wireless network 200 herein, base station 205 may provide wireless communications using one or more of the same frequencies (e.g., one or more frequency bands in licensed spectrum, unlicensed spectrum, or a combination thereof) as a neighboring cell. In some examples, an individual base station 205 or UE 215 may be operated by more than one network operating entity. In some other examples, each base station 205 and UE 215 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 2, base stations 205d and 205e are regular macro base stations, while base stations 205a-205c are macro base stations enabled with one of three-dimension (3D), full dimension (FD), or massive MIMO. Base stations 205a-205c take advantage of their higher dimension MIMO capabilities to exploit 3D beamforming in both elevation and azimuth beamforming to increase coverage and capacity. Base station 205f is a small cell base station which may be a home node or portable access point. A base station may support one or multiple (e.g., two, three, four, and the like) cells.

Wireless network 200 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 215 are dispersed throughout the wireless network 200, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology.

Some non-limiting examples of a mobile apparatus, such as may include implementations of one or more of UEs 215, include a mobile, a cellular (cell) phone, a smart phone, a session initiation protocol (SIP) phone, a wireless local loop (WLL) station, a laptop, a personal computer (PC), a notebook, a netbook, a smart book, a tablet, a personal digital assistant (PDA), and a vehicle. Although UEs 215*i-k* are specifically shown as vehicles, a vehicle may employ the communication configuration described with reference to any of the UEs 215*a-215k*.

Figure 3:
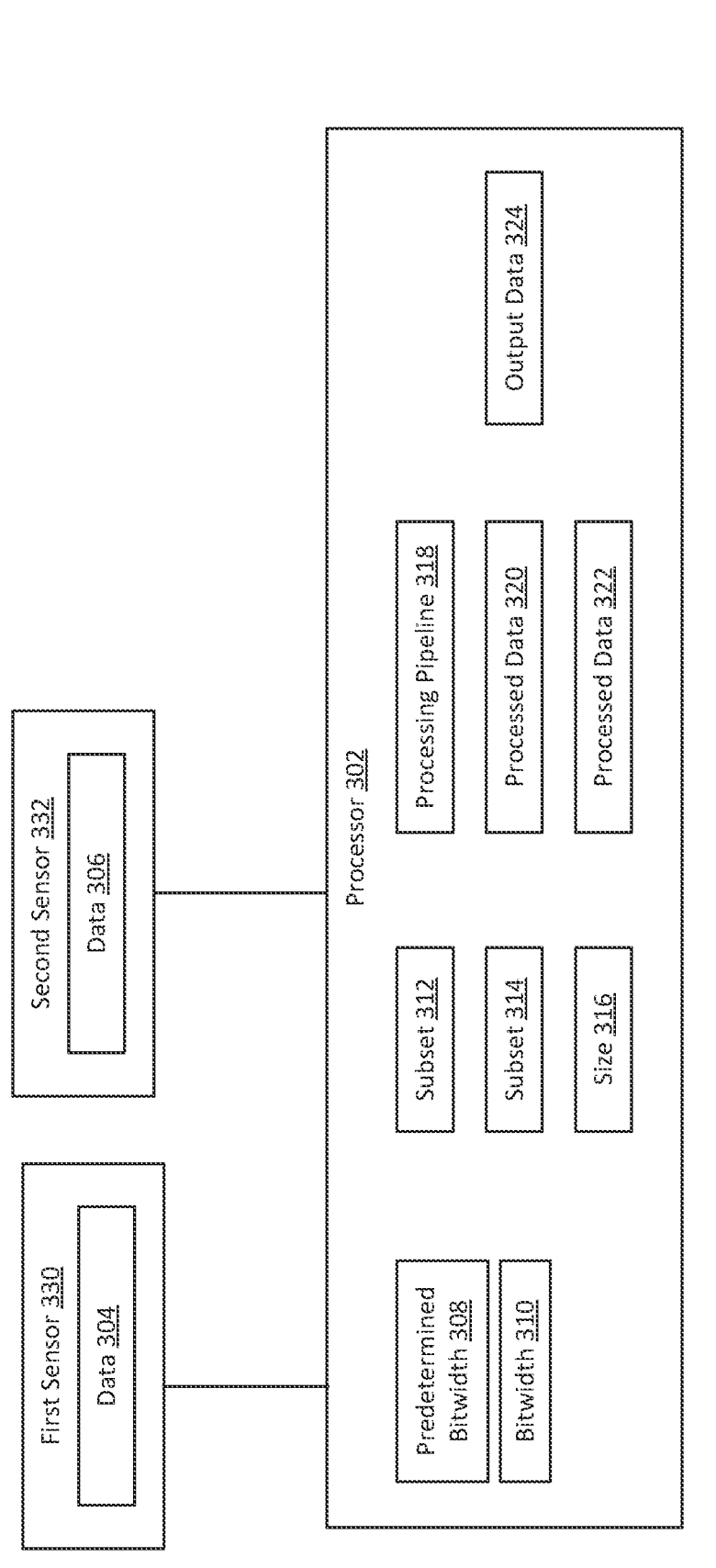
FIG. 3 is a block diagram illustrating a system for bitwidth responsive processor operation according to one or more aspects of the disclosure.

In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 215*a-215d* of the implementation illustrated in FIG. 2 are examples of mobile smart phone-type devices accessing wireless network 200. A UE may also be a machine specifically configured for connected communication, including machine type communication (MTC), enhanced MTC (eMTC), narrowband IoT (NB-IoT) and the like. UEs 215*c-215k* illustrated in FIG. 3 are examples of various machines configured for communication that access wireless network 200.

A mobile apparatus, such as UEs 215, may be able to communicate with any type of the base stations, whether macro base stations, pico base stations, femto base stations, relays, and the like. In FIG. 2, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 200 may occur using wired or wireless communication links.

In operation at wireless network 200, base stations 205*a-205c* serve UEs 215*a* and 215*b* using 3D beamforming and coordinated spatial techniques, such as coordinated multipoint (COMP) or multi-connectivity. Macro base station 205*d* performs backhaul communications with base stations 205*a-205c*, as well as small cell, base station 205*f*. Macro base station 205*d* also transmits multicast services which are subscribed to and received by UEs 215*c* and 215*d*. Such multicast services may include mobile television or stream video, or may include other services for providing community information, such as weather emergencies or alerts, such as Amber alerts or gray alerts.

Wireless network 200 of implementations supports mission critical communications with ultra-reliable and redundant links for mission critical devices, such UE 215*e*, which is a drone. Redundant communication links with UE 215*e* include from macro base stations 205*d* and 205*e*, as well as small cell base station 205*f*. Other machine type devices, such as UE 215*f* (thermometer), UE 215*g* (smart meter), and UE 215*h* (wearable device) may communicate through wireless network 200 either directly with base stations, such as small cell base station 205*f*, and macro base station 205*e*, or in multi-hop configurations by communicating with another user device which relays its information to the network, such as UE 215*f* communicating temperature measurement information to the smart meter, UE 215*g*, which is then reported to the network through small cell base station 205*f*. Wireless network 200 may also provide additional network efficiency through dynamic, low-latency TDD communications or low-latency FDD communications, such as in a vehicle-to-vehicle (V2V) mesh network between UEs 215*i-215k* communicating with macro base station 205*c*.

Aspects of the systems described with reference to, and shown in, FIGS. 1 and 2 may include receiving and processing sensor data, which may include sensor data in different bitwidths.

FIG. 3 is a block diagram illustrating a system 300 for bitwidth-responsive processor operation according to one aspect of the present disclosure. The system 300 may be an exemplary implementation of the processing system 100. The system 300 includes a first sensor 330, a second sensor 332, and a processor 302. The first sensor 330 includes first data 304 and the second sensor 332 includes second data 306. The processor 302 includes a first bitwidth 310, a predetermined bitwidth 308, a first subset 312, a second subset 314, a size 316, a processing pipeline 318, first processed data 320, second processed data 322, and output data 324.

The processor 302 may be configured to receive, at a processor 302, first data 304 from a first sensor 330. The processor 302 may be any of various types of processors. For example, the processor 302 may be a CPU (such as the processor 104), an ISP (such as the ISP 112), and the like. Data 304, 306 received by the processor 302 may be in different formats and/or different bitwidths in various implementations. In certain implementations, the sensors 330, 332 may be image sensors (such as the image sensors 101, 102) and the data 304, 306 may be image data (such as image frames 230). The first data 304 may have a first bitwidth 310. Data may have different bitwidths depending on the sensors 330, 332 (such as capabilities of the sensors, operating modes of the sensors, and the like). In certain implementations, the sensors 330, 332 may be capable of capturing data in different bitwidths. In one particular implementation, the first sensor 330 may be an image sensor configured with at least three operating modes: a first mode that captures HDR image data in an 18-bit bitwidth (such as using three exposures), a second mode that captures HDR image data in a 14-bit bitwidth, and a third mode that captures non-HDR image data in a 10-bit bitwidth. The sensor 102 may similarly have different operating modes with different bitwidths (including one or more operating modes that differ from those of the first sensor 101). In such implementations, the bitwidth of the data 304, 306 received from the sensors 101, 102 may differ depending on the operating mode of the sensors 101, 102. In certain implementations, the first data 304 may be image data and the first sensor 330 may be an image sensor. In such instances, the first bitwidth 310 may be a per-pixel bitwidth of the first data 304.

The processor 302 may be configured to determine that the first bitwidth 310 is greater than a predetermined bitwidth 308 associated with the processor 302. In certain implementations, the predetermined bitwidth 308 may be a maximum supported bitwidth of the processor 302. In certain implementations, the processor 302 may include one or more components that are capable of processing data with a particular maximum bitwidth. For example, the processor 302 may include one or more bit registers of a first size, and the maximum bitwidth of the processor 302 may be the first size of the bit registers. In certain implementations, the predetermined bitwidth 308 may be less than the maximum supported bitwidth of the processor 302. For example, the processor 302 may be operating in a low power mode, and the maximum supported bitwidth may be determined based on the low power mode (such as 1, 2, 3, 4, or more bits less than the maximum bitwidth for the processor. In certain implementations, the bitwidth may be determined based on the contents of the data 304. For example, the data 304 may be received in one of a plurality of predefined formats, and each of the predefined formats may be associated with a particular bitwidth. In additional or alternative implementations, the data 304 may include one or more predefined fields or headers that denote the bitwidth. In additional or alternative implementations, the processor 302 may employ pattern recognition to discern the number of significant bits used per data point and may determine the first bit width 310 based on the number of significant bits. In additional or alternative implementations, the sensors 330, 332 may be configured to signal the bitwidth 310 to the processor 302, such as through a register setting, control bit, or instruction received via a driver of the sensors 330, 332. In still further implementations, the processor 302 may be configured to control or configure the operation of the sensors 330, 332 and may determine the bitwidth 310 based on an operating mode of the sensors 330, 332. For example, the processor 302 may send control instructions to the sensor 330 to operate with a bitwidth 310 greater than the predetermined bitwidth 308 and may determine that the bitwidth 310 of the data 304 is greater than the predetermined bitwidth 308 based on the control instructions.

The processor 302 may be configured to determine a first subset 312 of the first data 304 and a second subset 314 of the first data 304. In certain implementations, a size 316 of the first subset 312 and the second subset 314 may be less than or equal to the predetermined bitwidth 308 of the processor 302. In certain implementations, determining the subsets 312, 314 may include determining the first subset 312 of the first data 304 to contain the first N bits of the first data 304 determining the second subset 314 of the first data 304 to contain the final M bits of the first data 304, where N and M are both less than or equal to the predetermined bitwidth 308 of the processor 302. In certain implementations, N may be equal to the predetermined bitwidth 308, M may be equal to the predetermined bitwidth, or a combination thereof. In certain implementations, N may be greater than M, N may be equal to M, or N may be less than M. In certain implementations, at least a portion of the first subset 312 and the second subset 314 may overlap, such as where the first N bits and the last M bits intersect. For example, when the processor 302 receives sensor data with a bitwidth of 18 bits, and the predetermined bitwidth is 12, and N=M=12, the first subset 312 may be determined as the first 12 bits of the 18-bit signal, the second subset 314 may be determined as the final 12 bits of the 18-bit signal, such that the middle 6 bits of the signal are included in both the first subset 312 and the second subset 314. In various implementations, the first subset 312 may be the same size as the second subset 314, may be smaller than the second subset 314, may be larger than the second subset 314, or combinations thereof. In certain implementations, the first subset 312 and the second subset 314 may be adjusted. For example, the first N bits may be rounded when determining the first subset 312. As another example, the final M bits may be clamped when determining the second subset 314. As one particular example, a 4-bit data point of "1001" may be split into a first subset that is 3 bits long and a second subset that is 3 bits long. In such instances, the first subset may be rounded to "101" based on the 4-bit data point and the second subset may be clamped to "101" based on the 4-bit data point.

Figure 4A:
FIG. 4A is a block diagram illustrating a system for bitwidth responsive processor operation according to one or more aspects of the disclosure.
Figure 4A:
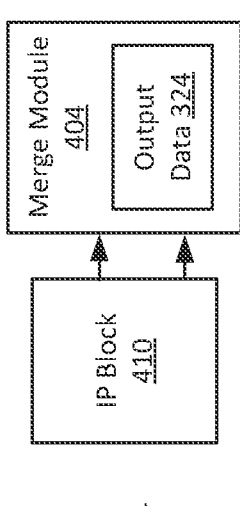
Figure 4A:
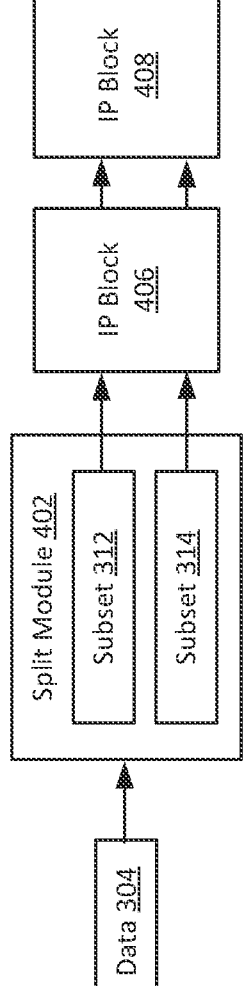

The processor 302 may be configured to process the first subset 312 and the second subset 314 to determine first processed data 320 and second processed data 322. In certain implementations, the first subset 312 of the first data 304 and the second subset 314 of the first data 304 are determined by a first component of the processor 302 in response to the first component determining that the first bitwidth 310 may be greater than the predetermined bitwidth 308. For example, the processing pipeline 318 may be designed as an image processing pipeline that includes several key blocks for image data manipulation and enhancement. The processing pipeline may include one or more IP blocks configured to receive and process data by performing particular functions. For example, in an image processing pipeline, the IP blocks may include one or more of a color correction block, a noise reduction filter, a sharpening filter, a white balance block, and the like. As one specific example, FIG. 4A includes a processing pipeline 400 according to one aspect of the present disclosure. The processing pipeline 400 may be an exemplary implementation of the processing pipeline 318. In the processing pipeline 400, data 304 is received by the split module 402, which may be configured to split the data 304 into the first subset 312 and the second subset 314 according to the above techniques. The subsets 312, 314 may then be received sequentially processed by one or more IP blocks 406, 408, 410 to determine processed data, which is then merged into the output data 324 by a merge module 404.

In certain implementations, the processor 302 may be configured to enable time sharing of the processing pipeline 318 (such as to reduce the area required for the processing pipeline 318 and the size of the resulting chips). For example, processing the first subset 312 and the second subset 314 of the first data 304 may include providing, by the first component at a first time, the first subset 312 of the first data 304 to a data processing pipeline 318 of the processor 302 to determine the first processed data 320. Processing the first subset 312 and the second subset 314 may then include providing, by the first component at a second time after the first time, the second subset 314 of the first data 304 to the data processing pipeline 318 of the processor 302 to determine the second processed data 322. In such instances, the same IP blocks may be used to process both the first subset 312 and the second subset 314.

In additional or alternative implementations, the processor 302 may include multiple processing pipelines that are able to process the first subset 312 and the second subset 314 at least partially in parallel. In certain implementations, the first subset 312 and the second subset 314 of the first data 304 are processed in parallel using at least two separate data processing pipelines 318 of the processor 302. In such instances, separate IP blocks may be used to process the first subset 312 and the second subset 314.

Figure 4B:
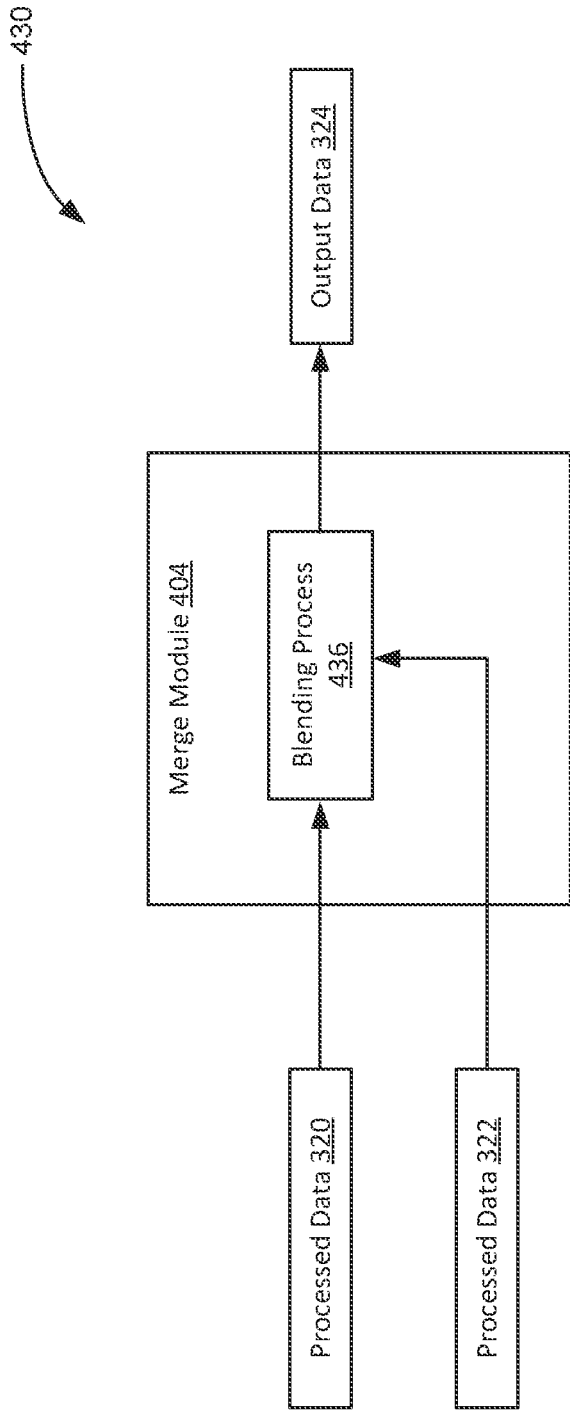
FIG. 4B is a block diagram of a merging process according to one aspect of the present disclosure.

The processor 302 may be configured to determine, by the processor 302, output data 324 based on the first and second processed data 322, the output data 324 has the first bitwidth 310. In certain implementations, the output data 324 may be determined using a two-dimensional merging process on the first processed image data and the second processed image data. In certain implementations, merging of the first process data 320 and the second process data 322 into the final output data 324 may be performed by a dedicated components of the processor 302. For example, merging may be performed by the merge module 404 in the processing pipeline 400. As another example, FIG. 4B depicts a merging pipeline 430 according to one aspect of the present disclosure. In particular, the merging pipeline 430 may show an exemplary implementation of the merge module 404. In the pipeline 430, the merge module 404 receives the processed data 320, 322, which may be blended according to a blending process 436. The blending process 436 maybe performed to blend overlapping portions of the processed data 320, 322. For example, as explained above, the first subset 312 in the second subset 314 may have one or more overlapping portions, depending on the size of the predetermined bitdwith 308 relative to the bitwidth 310 of the data 304. In certain implementations, the blending process 436 used when merging the processed data 320, 322 may be a one-dimensional blending of corresponding bits within the first processed data 320 and the second processed data 322. The one-dimensional approach may include linear interpolation, weighted averaging, or combinations thereof of the bit values from the first and second processed data 320, 322. In additional or alternative implementations, the blending process may include a multi-dimensional blending process such as a two-dimensional blending process that is determined based on both corresponding points in the first processed data 320 and the second processed data 322, and based on one or more adjacent points within the processed data 320, 322. As another example, three-dimensional blending processes may be used that combine two-dimensional blending with additional blending based on previous and/or subsequent data frames received from the sensor 330.

In certain implementations, the processor 302 may be further configured to receive second data 306 from a second sensor 332, and the second data 306 may have a second bitwidth different from the first bitwidth 310. The processor 302 may determine that the second bitwidth is less than or equal to the predetermined bitwidth 308 and, in response, may determine output data 324 based on the second data 306. The output data 324 may have the second bitwidth. In certain implementations, the second data may be received as the next consecutive data frame (such as an image frame) after the first data 304 within a stream of image frames received by the processor 302.

In certain implementations, the processor 302 may be further configured to store (i) an indicator of the first bitwidth 310 in association with an identifier of the first sensor 330 and (ii) an indicator of the second bitwidth in association with an identifier of the second sensor 332. In such implementations, the indicators may be stored for a predetermined period of time, for a predetermined amount of data received from the corresponding sensor, until data with a different bitwidth is received from the corresponding sensor, or combinations thereof.

The examples and implementations discussed above focused on instances where received data 304 is split into two subsets, which are processed to determine two sets of processed data that are merged together to form the output data 324. However, in various implementations, received data 304 may be split into more than two subsets (e.g., three subsets, four subsets, five subsets, and the like). In such instances, the three or more subsets of data may be similarly processed using a processing pipeline 318 before being merged. In one example with three subsets of received data 304, three sets of processed data may result after processing by the processing pipeline 318. In such instances, all three sets of processed data may be merged to form the output data 324 (such as using one or more blending steps).

FIG. 5 is a flow chart illustrating an example method 500 for bitwidth responsive processor operation according to one or more aspects of the present disclosure. The method may be performed by one or more of the above systems, such as the systems 100, 200, 300, 400, 430.

The method 500 includes receiving, at a processor 302, first data from a first sensor (block 502). For example, the processor 302 may receive, at a processor 302, first data 304 from a first sensor 330. The first data 304 may have a first bitwidth 310.

The method 500 includes determining that the first bitwidth is greater than a predetermined bitwidth associated with the processor (block 504). For example, the processor 302 may determine that the first bitwidth 310 may be greater than a predetermined bitwidth 308 associated with the processor 302. In certain implementations, the predetermined bitwidth 308 associated with the processor 302 may be a maximum bitwidth supported by the processor 302.

The method 500 includes determining a first subset of the first data and a second subset of the first data (block 506). For example, the processor 302 may determine a first subset 312 of the first data 304 and a second subset 314 of the first data 304. A size 316 of the first subset 312 and the second subset 314 may be less than or equal to the predetermined bitwidth 308 of the processor 302. In certain implementations, determine the first and second subset 312, 314 may further include determining the first subset 312 of the first data 304 to contain the first N bits of the first data 304 and determining the second subset 314 of the first data 304 to contain the final N bits of the first data 304, where N is the predetermined bitwidth 308 of the processor 302.

The method 500 includes processing the first subset and the second subset to determine first processed data and second processed data (block 508). For example, the processor 302 may process the first subset 312 and the second subset 314 to determine first processed data 320 and second processed data 322. In certain implementations, the first subset 312 of the first data 304 and the second subset 314 of the first data 304 are determined by a first component (such as a split module 402) of the processor 302 in response to the first component determining that the first bitwidth 310 is greater than the predetermined bitwidth 308. In certain implementations, processing the first subset 312 and the second subset 314 of the first data 304 may include providing the first subset 312 of the first data 304 to a data processing pipeline 318 of the processor 302 to determine the first processed data 320 and providing, at a second time after the first time, the second subset 314 of the first data 304 to the data processing pipeline 318 of the processor 302 to determine the second processed data 322. In additional or alternative implementations, the first subset 312 and the second subset 314 of the first data 304 are processed in parallel using at least two separate data processing pipelines 318 of the processor 302.

The method 500 includes determining, by the processor, output data based on the first and second processed data (block 510). For example, the processor 302 may determine, by the processor 302, output data 324 based on the first and second processed data 322. The output data 324 may have the first bitwidth 310. In certain implementations, the output data 324 may be determined using a blending process on the first processed image data and the second processed image data.

In certain implementations, the method 500 may further include receiving, at the processor 302, second data 306 from a second sensor 332, where the second data 306 has a second bitwidth different from the first bitwidth 310 and determining that the second bitwidth is less than or equal to the predetermined bitwidth 308. The method 500 may further include determining, by the processor 302, output data 324 based on the second data 306, where the output data 324 has the second bitwidth. In certain implementations, the second image data may be received as the next consecutive image frame after the first image data within a stream of image frames received by the processor 302.

In certain implementations, the method 500 may further include storing, within the processor 302, (i) an indicator of the first bitwidth 310 in association with an identifier of the first sensor 330 and (ii) an indicator of the second bitwidth in association with an identifier of the second sensor 332.

It is noted that one or more blocks (or operations) described with reference to FIG. 4 may be combined with one or more blocks (or operations) described with reference to another of the figures. For example, one or more blocks (or operations) of FIG. 4 may be combined with one or more blocks (or operations) of FIG. 1-3.

In one or more aspects, the above-described techniques may include additional aspects, such as any single aspect or any combination of aspects described below or in connection with one or more other processes or devices described elsewhere herein.

A first aspect provides a method that includes receiving, at a processor, first data from a first sensor, wherein the first data has a first bitwidth; determining that the first bitwidth is greater than a predetermined bitwidth associated with the processor; determining a first subset of the first data and a second subset of the first data, wherein a first size of the first subset and a second size the second subset are less than or equal to the predetermined bitwidth of the processor; processing the first subset and the second subset to determine first processed data and second processed data; and determining, by the processor, output data based on the first and second processed data, wherein the output data has the first bitwidth.

In a second aspect, in combination with the first aspect, the predetermined bitwidth associated with the processor is a maximum bitwidth supported by the processor.

In a third aspect, in combination with one or more of the first aspect through the second aspect, the output data is determined using a blending process on the first processed data and the second processed data.

In a fourth aspect, in combination with one or more of the first aspect through the third aspect, the method further includes determining the first subset of the first data to contain a first N bits of the first data; and determining the second subset of the first data to contain a final M bits of the first data, wherein N is less than or equal to the predetermined bitwidth of the processor and M is less than or equal to the predetermined bitwidth of the processor.

In a fifth aspect, in combination with the fourth aspect, determining the first subset of the first data further includes rounding the first N bits of the first data, and determining the second subset of the first data further includes clamping the final M bits of the first data.

In a sixth aspect, in combination with one or more of the first aspect through the fifth aspect, the first subset of the first data and the second subset of the first data are determined by a first component of the processor in response to the first component determining that the first bitwidth is greater than the predetermined bitwidth.

In a seventh aspect, in combination with one or more of the first aspect through the sixth aspect, processing the first subset and the second subset of the first data includes providing, at a first time, the first subset of the first data to a processing pipeline of the processor to determine the first processed data; and providing, at a second time after the first time, the second subset of the first data to the processing pipeline of the processor to determine the second processed data.

In an eighth aspect, in combination with one or more of the first aspect through the seventh aspect, the first subset and the second subset of the first data are processed in parallel using parallel processing pipelines of the processor.

In a ninth aspect, in combination with one or more of the first aspect through the eighth aspect, the method further includes receiving second data from a second sensor, wherein the second data has a second bitwidth different from the first bitwidth; determining that the second bitwidth is less than or equal to the predetermined bitwidth; and determining, by the processor, output data based on the second data, wherein the output data has the second bitwidth.

In a tenth aspect, in combination with the ninth aspect, the second data is received as a consecutive frame after the first data within a stream of frames received by the processor.

In an eleventh aspect, in combination with one or more of the ninth aspect through the tenth aspect, the method further includes storing, within the processor, (i) an indicator of the first bitwidth in association with an identifier of the first sensor and (ii) an indicator of the second bitwidth in association with an identifier of the second sensor.

In a twelfth aspect, in combination with one or more of the first aspect through the eleventh aspect, the first data is image data, wherein the first sensor is an image sensor, and wherein the first bitwidth is a per-pixel bitwidth of the first data.

A thirteenth aspect provides a device that includes one or more sensors comprising a first sensor; and one or more processors comprising a first processor configured to receive, at a processor, first data from a first sensor, wherein the first data has a first bitwidth; determine that the first bitwidth is greater than a predetermined bitwidth associated with the processor; determine a first subset of the first data and a second subset of the first data, wherein a first size of the first subset and a second size the second subset are less than or equal to the predetermined bitwidth of the processor; process the first subset and the second subset to determine first processed data and second processed data; and determine, by the processor, output data based on the first and second processed data, wherein the output data has the first bitwidth.

In a fourteenth aspect, in combination with the thirteenth aspect, the predetermined bitwidth associated with the first processor is a maximum bitwidth supported by the first processor.

In a fifteenth aspect, in combination with one or more of the thirteenth aspect through the fourteenth aspect, the first processor is further configured to: determine the first subset of the first data to contain a first N bits of the first data; and determine the second subset of the first data to contain a final M bits of the first data, wherein N is less than or equal to the predetermined bitwidth of the first processor and M is less than or equal to the predetermined bitwidth of the first processor.

In a sixteenth aspect, in combination with one or more of the thirteenth aspect through the fifteenth aspect, the first subset of the first data and the second subset of the first data are determined by a first component of the first processor in response to the first component determining that the first bitwidth is greater than the predetermined bitwidth.

In a seventeenth aspect, in combination with one or more of the thirteenth aspect through the sixteenth aspect, processing the first subset and the second subset of the first data includes providing, at a first time, the first subset of the first data to a processing pipeline of the first processor to determine the first processed data; and providing, at a second time after the first time, the second subset of the first data to the processing pipeline of the first processor to determine the second processed data.

In an eighteenth aspect, in combination with one or more of the thirteenth aspect through the seventeenth aspect, the first subset and the second subset of the first data are processed in parallel using parallel processing pipelines of the first processor.

In a nineteenth aspect, in combination with one or more of the thirteenth aspect through the eighteenth aspect, the first processor is further configured to: receive second data from a second sensor, wherein the second data has a second bitwidth different from the first bitwidth; determine that the second bitwidth is less than or equal to the predetermined bitwidth; and determine, by the first processor, output data based on the second data, wherein the output data has the second bitwidth.

A twentieth aspect provides a system that includes a processor configured to receive, at a processor, first data from a first sensor, wherein the first data has a first bitwidth; determine that the first bitwidth is greater than a predetermined bitwidth associated with the processor; determine a first subset of the first data and a second subset of the first data, wherein a first size of the first subset and a second size the second subset are less than or equal to the predetermined bitwidth of the processor; process the first subset and the second subset to determine first processed data and second processed data; and determine, by the processor, output data based on the first and second processed data, wherein the output data has the first bitwidth.

In some implementations, the system includes a wireless device, such as a UE. In some implementations, the system may include at least one processor, and a memory coupled to the processor. The processor may be configured to perform operations described herein with respect to the apparatus. In some other implementations, the system may include a non-transitory computer-readable medium having program code recorded thereon and the program code may be executable by a computer for causing the computer to perform operations described herein with reference to the system. In some implementations, the system may include one or more means configured to perform operations described herein. In some implementations, a method of wireless communication may include one or more operations described herein with reference to the system.

Components, the functional blocks, and the modules described herein with respect to FIGS. 1-4 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:
receiving, at a processor, first data from a first sensor, wherein the first data has a first bitwidth;
determining that the first bitwidth is greater than a predetermined bitwidth associated with the processor;
determining a first subset of the first data and a second subset of the first data, wherein a first size of the first subset and a second size the second subset are less than or equal to the predetermined bitwidth of the processor;
processing the first subset and the second subset to determine first processed data and second processed data; and
determining, by the processor, output data based on the first and second processed data, wherein the output data has the first bitwidth.

2. The method of claim 1, wherein the predetermined bitwidth associated with the processor is a maximum bitwidth supported by the processor.

3. The method of claim 1, wherein the output data is determined using a blending process on the first processed data and the second processed data.

4. The method of claim 1, further comprising:
determining the first subset of the first data to contain a first N bits of the first data; and
determining the second subset of the first data to contain a final M bits of the first data,
wherein N is less than or equal to the predetermined bitwidth of the processor and M is less than or equal to the predetermined bitwidth of the processor.

5. The method of claim 4, wherein determining the first subset of the first data further comprises rounding the first N bits of the first data, and
wherein determining the second subset of the first data further comprises clamping the final M bits of the first data.

6. The method of claim 1, wherein the first subset of the first data and the second subset of the first data are determined by a first component of the processor in response to the first component determining that the first bitwidth is greater than the predetermined bitwidth.

7. The method of claim 1, wherein processing the first subset and the second subset of the first data comprises:

providing, at a first time, the first subset of the first data to a processing pipeline of the processor to determine the first processed data; and providing, at a second time after the first time, the second subset of the first data to the processing pipeline of the processor to determine the second processed data.

8. The method of claim 1, wherein the first subset and the second subset of the first data are processed in parallel using parallel processing pipelines of the processor.

9. The method of claim 1, further comprising:

receiving second data from a second sensor, wherein the second data has a second bitwidth different from the first bitwidth;

determining that the second bitwidth is less than or equal to the predetermined bitwidth; and determining, by the processor, output data based on the second data, wherein the output data has the second bitwidth.

10. The method of claim 9, wherein the second data is received as a consecutive frame after the first data within a stream of frames received by the processor.

11. The method of claim 9, further comprising storing, within the processor, (i) an indicator of the first bitwidth in association with an identifier of the first sensor and (ii) an indicator of the second bitwidth in association with an identifier of the second sensor.

12. The method of claim 1, wherein the first data is image data, wherein the first sensor is an image sensor, and wherein the first bitwidth is a per-pixel bitwidth of the first data.

13. A device comprising:

one or more sensors comprising a first sensor;

one or more processors comprising a first processor configured to:

receive, at a processor, first data from a first sensor, wherein the first data has a first bitwidth;

determine that the first bitwidth is greater than a predetermined bitwidth associated with the processor;

determine a first subset of the first data and a second subset of the first data, wherein a first size of the first subset and a second size the second subset are less than or equal to the predetermined bitwidth of the processor;

process the first subset and the second subset to determine first processed data and second processed data; and determine, by the processor, output data based on the first and second processed data, wherein the output data has the first bitwidth.

14. The device of claim 13, wherein the predetermined bitwidth associated with the first processor is a maximum bitwidth supported by the first processor.

15. The device of claim 13, wherein the first processor is further configured to:

determine the first subset of the first data to contain a first N bits of the first data; and determine the second subset of the first data to contain a final M bits of the first data, wherein N is less than or equal to the predetermined bitwidth of the first processor and M is less than or equal to the predetermined bitwidth of the first processor.

16. The device of claim 13, wherein the first subset of the first data and the second subset of the first data are determined by a first component of the first processor in response to the first component determining that the first bitwidth is greater than the predetermined bitwidth.

17. The device of claim 13, wherein processing the first subset and the second subset of the first data comprises:

providing, at a first time, the first subset of the first data to a processing pipeline of the first processor to determine the first processed data; and providing, at a second time after the first time, the second subset of the first data to the processing pipeline of the first processor to determine the second processed data.

18. The device of claim 13, wherein the first subset and the second subset of the first data are processed in parallel using parallel processing pipelines of the first processor.

19. The device of claim 13, wherein the first processor is further configured to:

receive second data from a second sensor, wherein the second data has a second bitwidth different from the first bitwidth;

determine that the second bitwidth is less than or equal to the predetermined bitwidth; and determine, by the first processor, output data based on the second data, wherein the output data has the second bitwidth.

20. A system comprising:

a processor configured to:

receive, at a processor, first data from a first sensor, wherein the first data has a first bitwidth;

determine that the first bitwidth is greater than a predetermined bitwidth associated with the processor;

determine a first subset of the first data and a second subset of the first data, wherein a first size of the first subset and a second size the second subset are less than or equal to the predetermined bitwidth of the processor;

process the first subset and the second subset to determine first processed data and second processed data; and determine, by the processor, output data based on the first and second processed data, wherein the output data has the first bitwidth.

* * * * *